(12) United States Patent
Nauseda et al.

(10) Patent No.: US 6,863,250 B2
(45) Date of Patent: Mar. 8, 2005

(54) DISPOSABLE FILTER FLOOR STAND

(75) Inventors: Curtis Nauseda, Somerville, MA (US); Stephen P. Proulx, Boxborough, MA (US); Kevin G. McInerney, Chelmsford, MA (US); Joseph M. Almasian, Westford, MA (US); Chau Nguyen, Dorchester, MA (US); Jeremy C. Perreault, Leominster, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 10/741,910

(22) Filed: Dec. 19, 2003

(65) Prior Publication Data

US 2004/0144901 A1 Jul. 29, 2004

Related U.S. Application Data

(60) Provisional application No. 60/442,711, filed on Jan. 27, 2003.

(51) Int. Cl.[7] ............................................. A47G 23/02
(52) U.S. Cl. ........................................ 248/150; 248/151
(58) Field of Search ................................ 248/150, 146, 248/166, 188, 151; 211/85, 14

(56) References Cited

U.S. PATENT DOCUMENTS

| | | | | |
|---|---|---|---|---|
| D57,688 S | * | 4/1921 | Lukaszewska | ............... D7/403 |
| 1,823,616 A | * | 9/1931 | Leslie | ......................... 248/150 |
| 4,064,993 A | * | 12/1977 | Getner | ......................... 211/85 |
| D274,782 S | * | 7/1984 | Little | ............................ D7/397 |
| 6,398,040 B1 | * | 6/2002 | Gregory | ....................... 211/14 |
| 6,517,036 B1 | * | 2/2003 | Ramirez, Jr. | ................. 248/150 |
| 6,722,293 B2 | * | 4/2004 | Lee | ............................. 108/118 |

* cited by examiner

*Primary Examiner*—Leslie A. Braun
*Assistant Examiner*—Tan Le
(74) *Attorney, Agent, or Firm*—John Dana Hubbard

(57) ABSTRACT

The present invention relates to a stand for holding disposable filter capsules and is formed of three or more legs, a base above the legs and to which the leg as are attached and three or more arms that are attached to an opposite surface of the base from that of the legs. The arms and legs have at least curved or angled portion that allows for the arms and legs to spread out from the diameter of the base. Preferably, the arms have a second curved or angled portion that then allows the upper portion of the arms to become substantially vertical.

16 Claims, 7 Drawing Sheets

DISPOSABLE FILTER FLOOR STAND

This application claims the benefit of provisional application 60/442,711 filed on Jan. 27, 2003.

The present invention relates to a floor stand for disposable filters. More particularly it relates to a floor stand for disposable filters that is portable, easy to clean and which takes up little floor space in use or during storage.

BACKGROUND OF THE INVENTION

Traditional "stand alone" cartridge filters are typically plugged into a fixed stainless steel housing which is permanently (or semi permanently) mounted to a drug processing line when used in the context of a biotech or pharmaceutical processing.

Recent trends in the drug/biotech industry have shifted toward the use of disposable filter capsules as opposed to the stainless steel systems described above. The use of these disposable filter capsules comes with it the challenge of holding or fixturing the filter capsule during processing.

These disposable, capsule based devices do not fit into the traditional inline or T-line stainless steel holders. They often are simply laid on a bench or a rolling cart and connected to the system by plastic tubing. To prevent their movement, the use of tape or clamps has been employed to temporarily hold them in place. Others have formed wall mounts to hold the capsules in place.

One design is a floor stand comprised of a base, a center pole and one or more brackets at the top of the center pole to hold the capsules in place.

It has several drawbacks. It is capable of holding capsules in a "bell down" position. The inlet and outlet are at the top with the rest of the capsule projecting downwardly. Some capsules are designed to be operated in a "bell up" (inlet and outlet are at the bottom and the rest of the capsule is projected upwardly) position and either do not work in a bell down position or do not work as efficiently in that position.

The design is static and takes up a large amount of floor space, both during use and storage. Lastly, the device has many crevices and hooks which are difficult to keep clean.

What is needed is a simpler, more efficient floor stand for disposable filter capsules.

SUMMARY OF THE INVENTION

The present invention relates to a stand for holding disposable filter capsules and is formed of three or more legs, a base above the legs to which the legs are attached and three or more arms that are attached to an opposite surface of the base from that of the legs. The arms and legs have a curved or angled portion that allows for the arms and legs to spread out from the diameter of the base. Preferably, the arms have a second curved or angled portion that then allows the upper portion of the arms to become substantially vertical.

The design can be used with either in-line or "T"-line filters.

The design can accommodate housing "Bell Up" or "Bell Down" orientation.

For disposable filter capsules which have a T-Line configuration, the design of the device will allow for multiple filter units to be connected in series (i.e. the filtrate/outlet of the first unit is connected to the feed/inlet of the next unit, and so on, for subsequent filter connections). This is achieved through the specific placement of the legs of the device with respect to the filter position while being held in place.

While the device described above is preferably fabricated from metal (stainless steel), there is also a second design offering which is a plastic molded version which is intended to be produced at a much lower cost and ultimately disposed of with the capsule filter when the process is complete.

The floor stand device described in the application solves the problem of simply holding the filter capsule while addressing several other issues presented during drug processing. The device is easy to use; simply slide the filter onto the device and it is ready for use. There are no clamps or screws that are necessary to secure the filter. Likewise, the device is easy to clean as it provides little if no hidden spaces or crevices into which bacteria and other contaminants can hide. In another version with removable arms and legs, the parts can be disassembled and autoclaved, again to eliminate any possible contamination risk. Further, it allows for compact storage by nesting one stand on top of another to take up no more floor space than is used for one stand.

This free standing holder device also provides unlimited flexibility in that it is not constrained to a filter holder which is permanently mounted to a wall or skid. This portability allows for easy transport within a production area to an autoclave or to a cleaning suite.

IN THE DRAWINGS

DETAILED DESCRIPTION OF THE INVENTION

Figure 1:
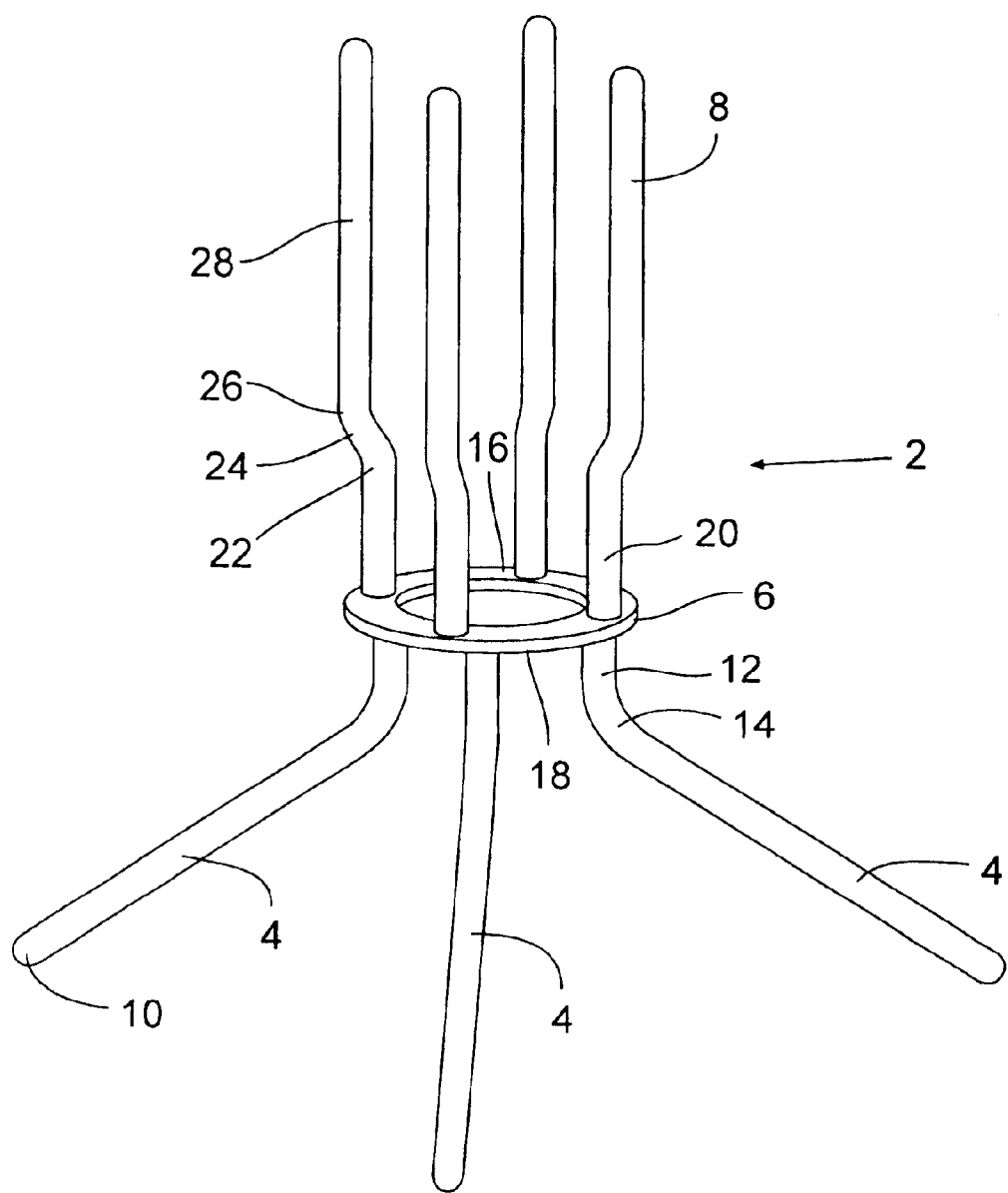
FIG. 1 shows a first embodiment of the present invention in perspective view.

FIG. 1 shows a floor stand 2 according to one embodiment of the present invention.

The stand 2 has three major components: Three or more legs 4, a base 6 and three or more capsule support arms 8. As shown, there are three legs 4 and four arms 8.

Each leg 4 as shown in this embodiment is formed of two sections; a portion 10 that contacts the floor and a portion 12 that mates with the base 6. The two portions 10, 12 are mated to each other by an angled portion 14 which forms an angle between the two other portions 10, 12. Typically, the base portion 12 of the leg 4 is substantially vertical and the floor portion 10 projects preferably outwardly and downwardly at an angle to the vertical between about 0° and about 90°. This angle is defined by the angled portion 14 from the centerline of the base portion 12. Preferably, the angle is between about 15° and about 75°. In one preferred embodiment, it is about 54°.

In an alternative embodiment, not shown, the leg itself is straight, but the base portion where it attaches to the base is formed on an angle such that the legs splay out evenly from the base. In this instance, the angled portion has an angle of 0° and the portion where it attaches to the base is typically between about 5° and 75°.

Preferably, each leg is made of a single piece of material, such as metal, including but not limited to stainless steel, steel, aluminum, brass or copper or a plastic including but not limited to polypropylene, nylon, ABS or polycarbonate or a reinforced synthetic material such as fiberglass, filled epoxies, graphite composites and the like. Metal is preferred in this embodiment, particularly stainless steel as it is the common material used in the pharmaceutical industry.

The legs 4 may be hollow (tubular) or solid. If hollow, the legs 4 need to have each end sealed. The legs 4 are preferably spaced equal distance from each other to provide optimum stability to the stand 2. For example, in the embodiment of FIG. 1 with three legs 4, the legs are preferably spaced 120° from each other around an imaginary circle on the base 6. Four legs would be 90° form each other and so forth.

The base 6 is formed between the legs 4 and the arms 8 and holds each to the base 6. The base 6, as shown in FIG. 1, is a ring. It may also be a solid circle or some type of polygon such as a square, pentagon, hexagon and the like and in those polygonal configurations it may either be solid or contain a hollow center. A base 6 with hollow center portion is preferable as it reduces weight and will in some cases accommodate "Inline" capsules and a portion of the "T-line" capsules when in the bell down position The base 6 is preferably made of the same material as the legs 4.

Attached to the base surface 16, opposite that to which the legs 4 are attached, are the arms 8. As shown in the FIG. 1, there are four arms 8. The arms 8 are preferably equal distance from each other. Other arrangements may be used, especially when using an even number of arms 8. For example, even with four arms 8, one could arrange two pairs of arms 8 opposite from each other with the two members of each pair being closer to each other than to the opposite pair. A myriad of combinations are possible, however for universal use, it is preferred that each stand 2 have the same configuration of arms and legs and more preferably that they all be equidistant from each other to allow for ease of use and storage.

The arms are preferably made of the same material as the legs 4 and base 6.

Each arm 8 has a lower portion 20 which is attached to the base 6 and preferably extends substantially vertically upward from the base although other angles may be used so long as they accomplish the same goal. A first angled portion 22 forms an angle outwardly from the center line of the lower portion 20. This angle may be from about 5° to about 90° from vertical. This is followed by a straight portion 24 which then connects to a second angled portion 26 which is preferably at an angle equal and opposite to that of the first angled portion 22. The top portion 28 preferably extends substantially vertically upward from the second angled portion 26.

In another embodiment (not shown), the second angle may be larger than that of the first so as to cause the top portion of the arms to extend inward so as to lightly touch the capsule and hold it in place.

Figure 2:
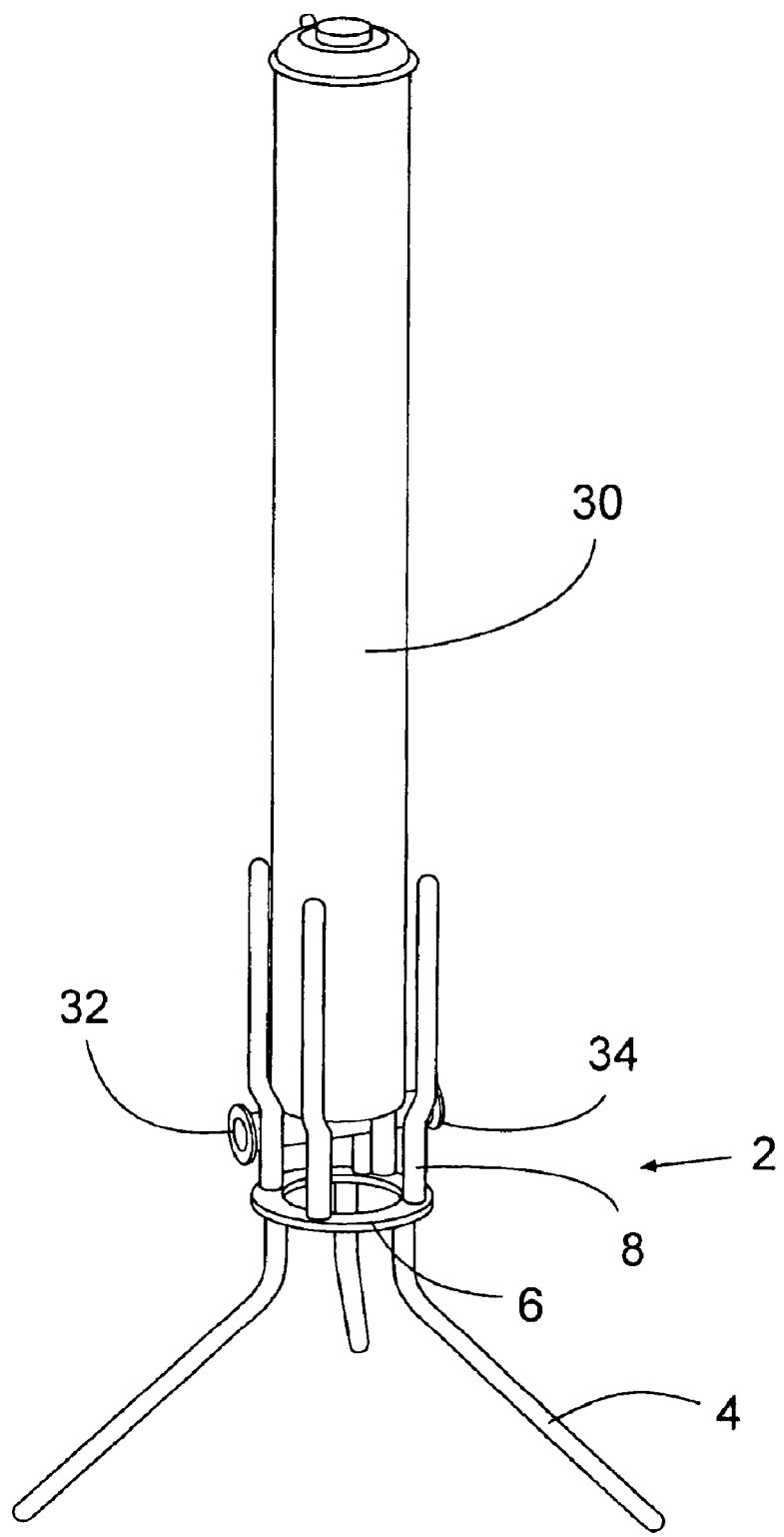
FIG. 2 shows the embodiment of FIG. 1 with a capsule in place in perspective view.

Other embodiments of the arms that accomplish the same function as the arms in FIGS. 1–3 can also be used to create this basket effect of the arms having a narrow bottom portion and a more open or more closed top portion and they are intended to be included in the scope of the present invention.

The three or more arms 8 form a basket-type of arrangement for holding a filter capsule in place. FIG. 2 shows a filter capsule 30 placed into the stand 2. The capsule 30 is kept in a vertical position (in this Figure in a bell up position) by the arms 8. Also, as shown in FIG. 2, the inlet 32 and outlet 34 for the capsule 30 are easily accessible.

The number of arms and legs in one embodiment is different than the other. For example in the design of FIG. 1, there are three legs and four arms. This allows for adequate spacing between the arms and legs so as to allow for the capsule and its associated hoses and other items to be fit into the stand easily. Additionally, the legs can be placed close to each other with interference so that the capsules can be mated directly to each other if desired through the use of tri-clover clamps and Ladish clamps and the like with a minimum of floor space. Also as seen in the embodiment of FIG. 1, the arms 8 are equally spaced from each other (four arms are 90° spaced from each other) and are offset from the legs so as not to be inline with the legs 4. It is designed in this manner to allow for the maximum stacking potential for these stands.

In another embodiment, the arms and legs are equal in number but are offset from each other so as not to be directly in line with each other. In a further embodiment they are equal in number and in line with each other. In an additional embodiment, the number of arms is always one more than the number of legs.

In another embodiment, the legs and arms are all made from one piece of material and the base has a series of holes through which the leg/arm piece is inserted and secured (such as by welding, adhesives, clamps and the like if metal and adhesives, thermal bonding, ultrasonic welding, clamps and the like if plastic or reinforced synthetic materials).

Figure 3A:
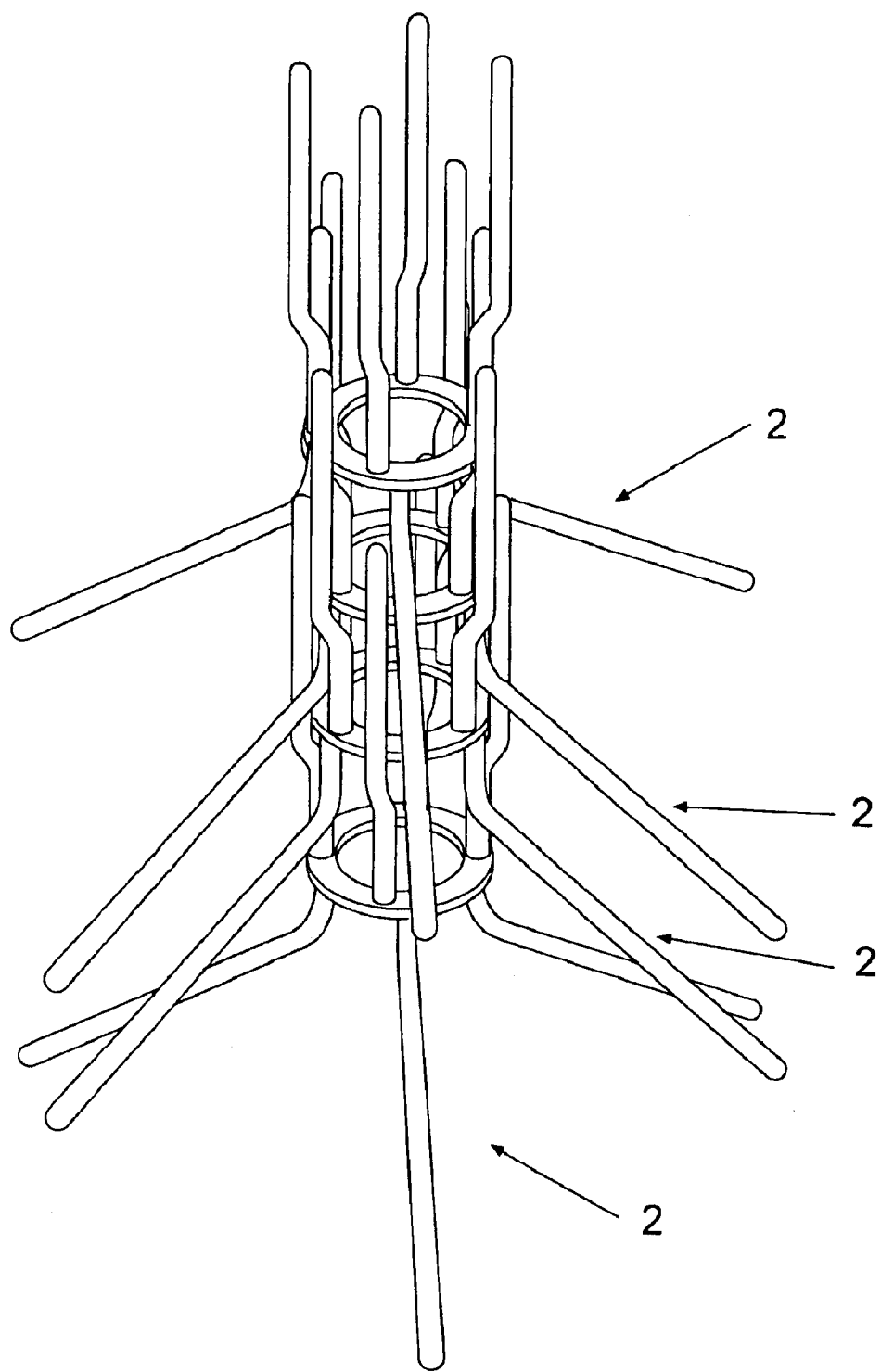
FIG. 3A shows the embodiment of FIG. 1 in storage in perspective view.
Figure 3B:
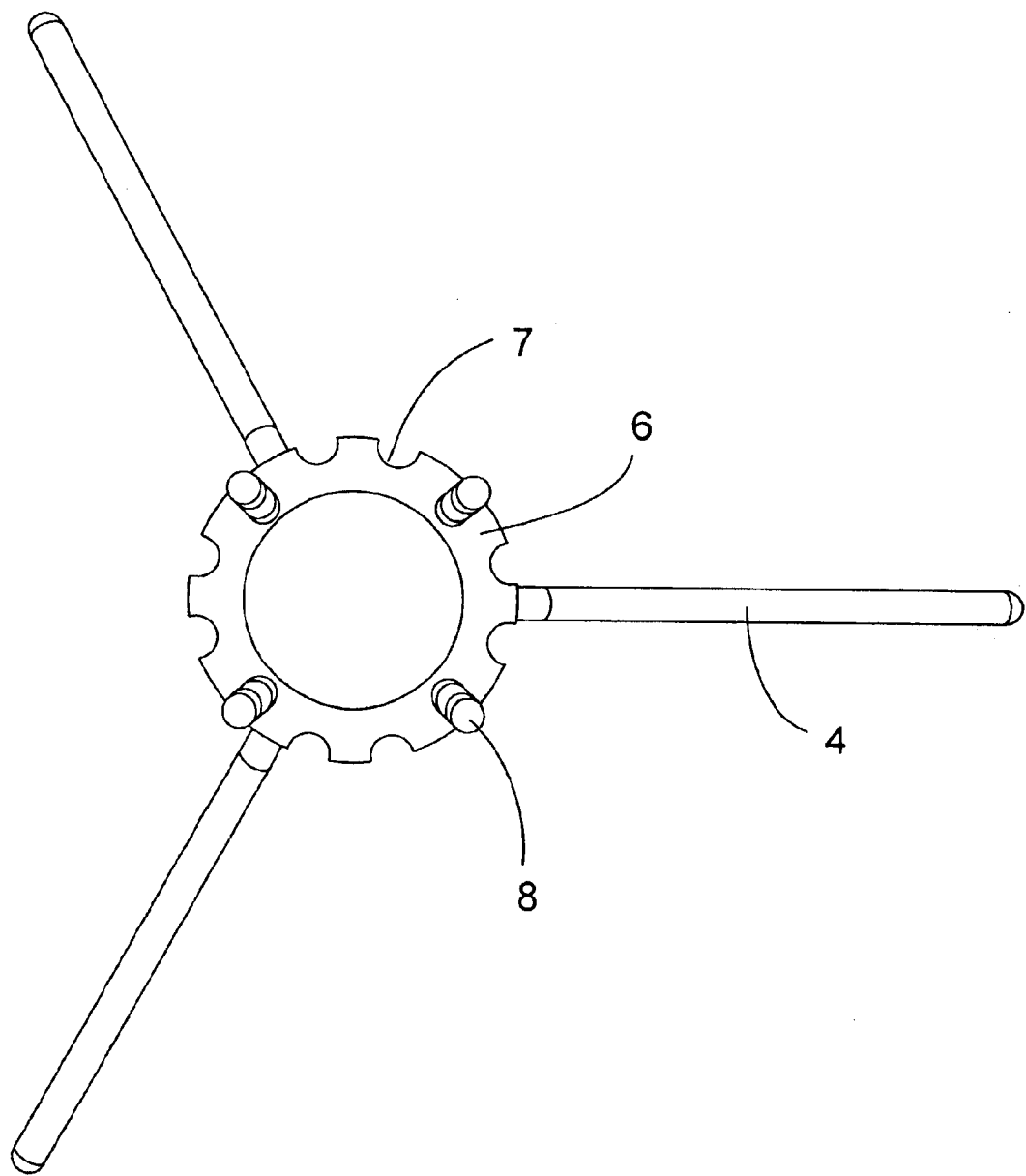
FIG. 3B shows the embodiment of FIG. 1 in a top down view.

An additional requirement of the floor stand is that multiple units do not take up a large "footprint" when they are not being used. The floor space in a drug processing facility is generally in high demand. This means that there is limited space and that it is expensive. The design of the floor stand, when not in use, provides for stacking of the units one on top of another, thereby minimizing the required storage space on the production floor. FIG. 3A shows a series of four stands 2 as stored. Their design is such that they can be stacked on top of each other so as to take up only the floor space equal to that of one such stand 2. There are at least four notches, one for each arm 8, in base 6 which provide for alignment during stacking of multiple units for storage. In units designed for multiple stackings of stands, 8 notches are preferred. This is shown in FIG. 3B. The notches 7 are spaced around the base 6 so that the arms 8 of a stand below it in the stack extend up through the notches 7 and are not distorted. Additionally, the notches 7 provide additional stability to the stacked arrangement. Likewise, in FIG. 3B one can see the first preferred arrangement of the arms 8 and the legs 4 and their spacing to each other.

For disposable filter capsules which have a T-Line configuration, the design of the device will allow for multiple filter units to be connected in series (i.e. the filtrate/outlet of the first unit is connected to the feed/inlet of the next unit, and so on, for subsequent filter connections). This is achieved through specific placement of the legs of the device with respect to the filter position while being held in place so that they can be located close to each other without interfering with the attachment of the capsules.

The arms 8 and legs 4 can be attached to the base 6 by a variety of means. It is a preferred method, when using metal as the material of construction, to weld the arms 8 and legs 4 respectively to the base 6. This provides for robust and hermetically sealed connection, eliminating any crevice whereby bacteria or other contamination can be inaccessible to subsequent cleaning.

Another preferred method when using synthetic materials of construction is to mold the stand as a single piece.

A further preferred method is to attach the legs 4 and arms 8 to the base via a threaded connection formed between the base 6 and the respective arms 8 and/or legs 4. This may include forming a female thread connection in the base 6 and male thread connections on the arms 8 and legs 4 which are then mated to the respective female connections of the base 6.

Another method is to form male threaded portions in the ends of the legs 4 and arms 8 which attach to the base 6.

Other methods of attachment include adhesives, sonic welding, thermal bonding and the like.

Drug processing equipment is always scrutinized by its users and their regulators for its ability to be adequately cleaned or sterilized in between subsequent processing steps. Ideally there should be no small holes, cracks or crevices whereby liquid, bacteria or other foreign material can get into but not be easily removed. Due to its simplistic and clean design, the filter stand/holder has no open areas whereby material can be trapped. There are full fillet welds which give the legs their integrity and strength, but do not provide pockets or recessed areas for material to be trapped. At a microscopic level, the surface roughness of the entire device is polished to a level which will allow for proper cleaning. On the contrary, a poorly machined surface with high surface roughness might provide for "hard to clean" areas.

Figure 4:
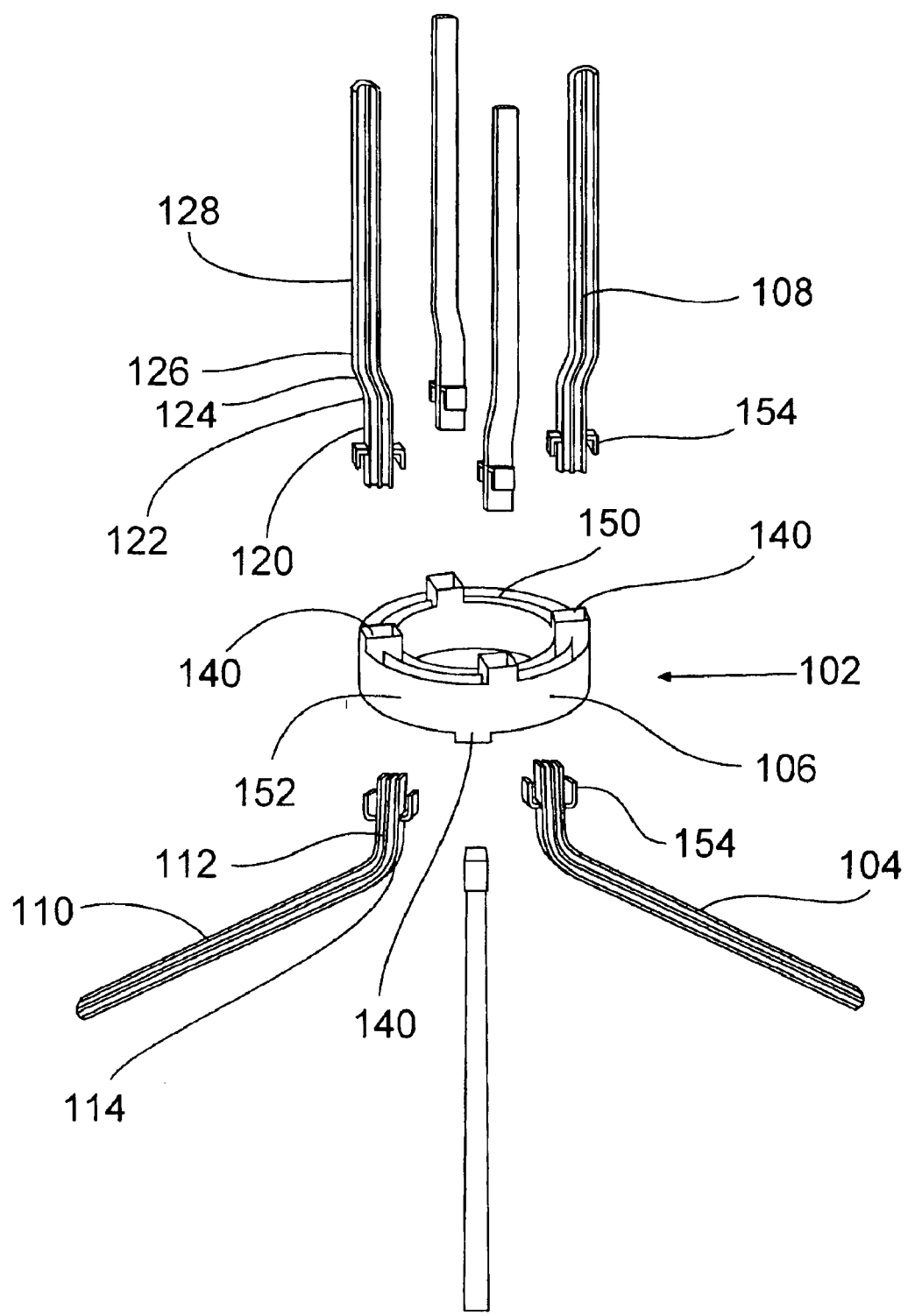
FIG. 4 shows a second embodiment of the present invention in exploded view.

FIG. 4 shows a second embodiment of the present invention. This embodiment is specifically designed to be taken apart for storage and cleaning. The stand 102 contains the same three elements as the first embodiment: three or more legs 104, a base 106 and three or more arms 108. The shape of the arms 108, legs 104 and base 106 are similar to those described above in regard to FIGS. 1–3.

For example, each leg 104 is formed of two sections; a portion 110 that contacts the floor and a portion 112 that mates with the base 106. The two portions 110, 112 are mated to each other by an elbow portion 114 which forms an angle between the two other portions 110, 112. Typically, the base portion 112 of the leg 104 is substantially vertical and the floor portion 110 projects outwardly and downwardly at an angle to the vertical between about 0° and about 90°. This angle is defined by the elbow portion 114. Preferably, the angle is between about 30° and about 60°. In one preferred embodiment the angle is 54°.

Preferably, each leg is made of a single piece of material, such as metal, including but not limited to stainless steel, steel, aluminum, brass or copper or a plastic such as but not limited to: polypropylene, nylon, ABS, polycarbonate or a reinforced synthetic material such as fiberglass, filled epoxies, graphite composites and the like. Plastic is preferred in this embodiment, particularly polycarbonate as it is a common material used in the pharmaceutical industry.

Likewise, the base 106 is formed between the legs 104 and the arms 108 and holds each to the base 106. The base 106, as shown in FIG. 4, is a ring. It may also be a solid circle or some type of polygon such as a square, pentagon, hexagon and the like and in those configurations it may either be solid or contain a hollow center. A base 106 with hollow center portion is preferable as it reduces weight and will in some cases accommodate "in-line" capsules and a portion of the "T-line" capsules when in the bell down position. The base 106 can be made of the same material as the legs 104.

As shown in the FIG. 4, there are four arms 108 although there may be three or more in other embodiments. The arms 108 are preferably equal distance from each other. Other arrangements may be used, especially when using an even number of arms 108. For example, even with four arms 108, one could arrange two pairs of arms 108 opposite from each other with the two members of each pair being closer to each other than to the opposite pair. A myriad of combinations are possible, however for universal use, it is preferred that each stand 102 have the same configuration of arms and legs and more preferably that they all be equidistant from each other.

The arms are preferably made of the same material as the legs 104 and base 106.

Each arm 108 has a lower portion 120 which is attached to the base 106 and extends substantially vertically upward from the base. A first angled portion 122 forms an angle outwardly from the center line of the lower portion 120. This angle may be from about 5° to about 30° from vertical. This is followed by a straight portion 124 which then connects to a second angled portion 126 which is at an angle equal and opposite to that of the first angled portion 122. The top portion 128 extends substantially vertically upward from the second angled portion 126.

Other embodiments of the arms that accomplish the same function as the arms in FIG. 4 including those described above in relation to FIGS. 1–3 and can also be used to create this basket effect of the arms having a narrow bottom portion and a more open or more closed top portion and they are intended to be included in the scope of the present invention.

Figure 6:
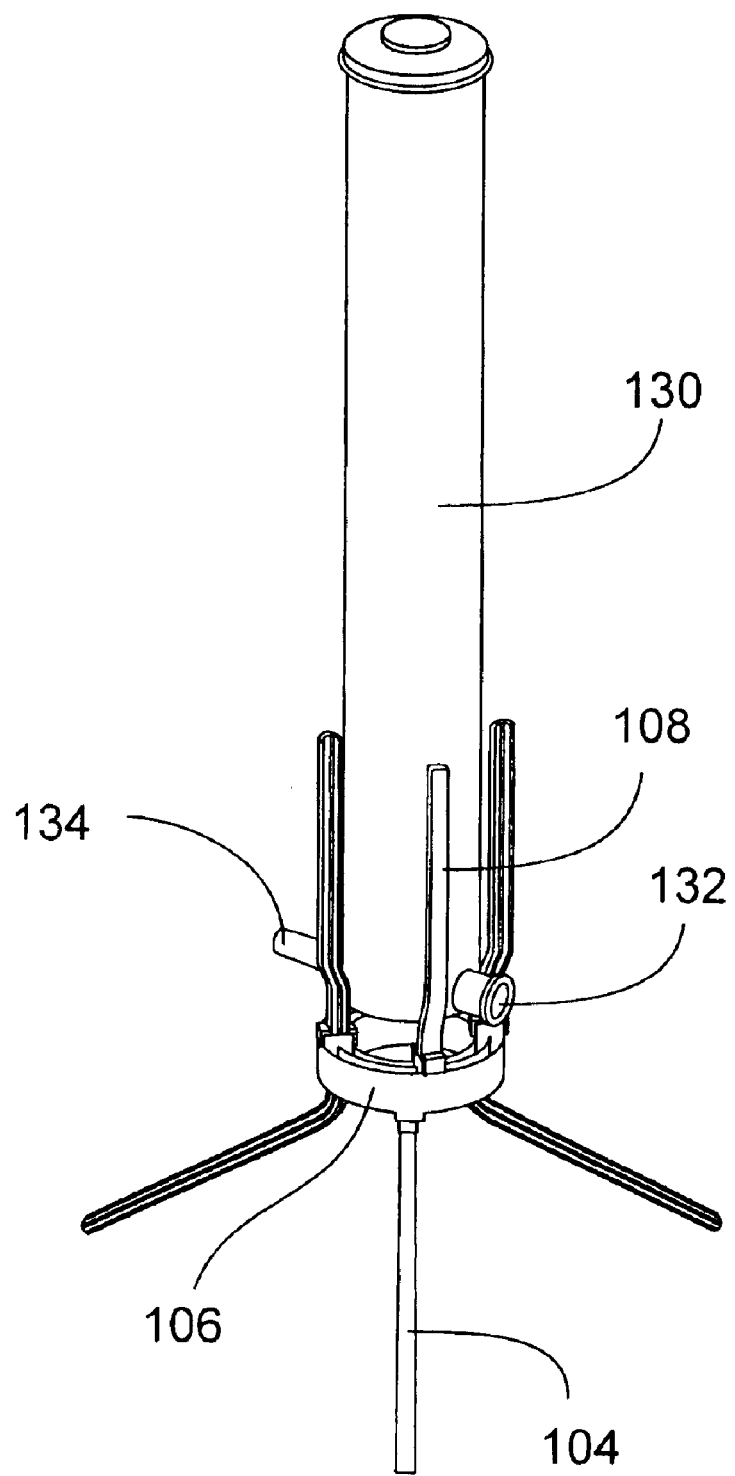
FIG. 6 shows the embodiment of FIG. 4 with a capsule in place in perspective view.

The three or more arms 108 form a basket-type of arrangement for holding a filter capsule in place. FIG. 6 shows a filter capsule 130 placed into the stand 102 by the arms 108. The capsule 130 is kept in a vertical position (in this Figure in a bell up position) by the arms 108. Also, as shown in FIG. 6, the inlet 132 and outlet 134 for the capsule 130 are easily accessible.

The number of arms and legs in one embodiment is different than the other. For example in the design of FIG. 4, there are three legs and four arms. This allows for adequate spacing between the arms and legs so as to allow for the capsule and its associated hoses and other items to be fit into the stand easily. In another embodiment, the arms and legs are equal in number but are offset from each other so as not to be directly in line with each other. In a further embodiment they are equal in number and in line with each other. In an additional embodiment, the number of arms is always one greater than the number of legs present.

Figure 5:
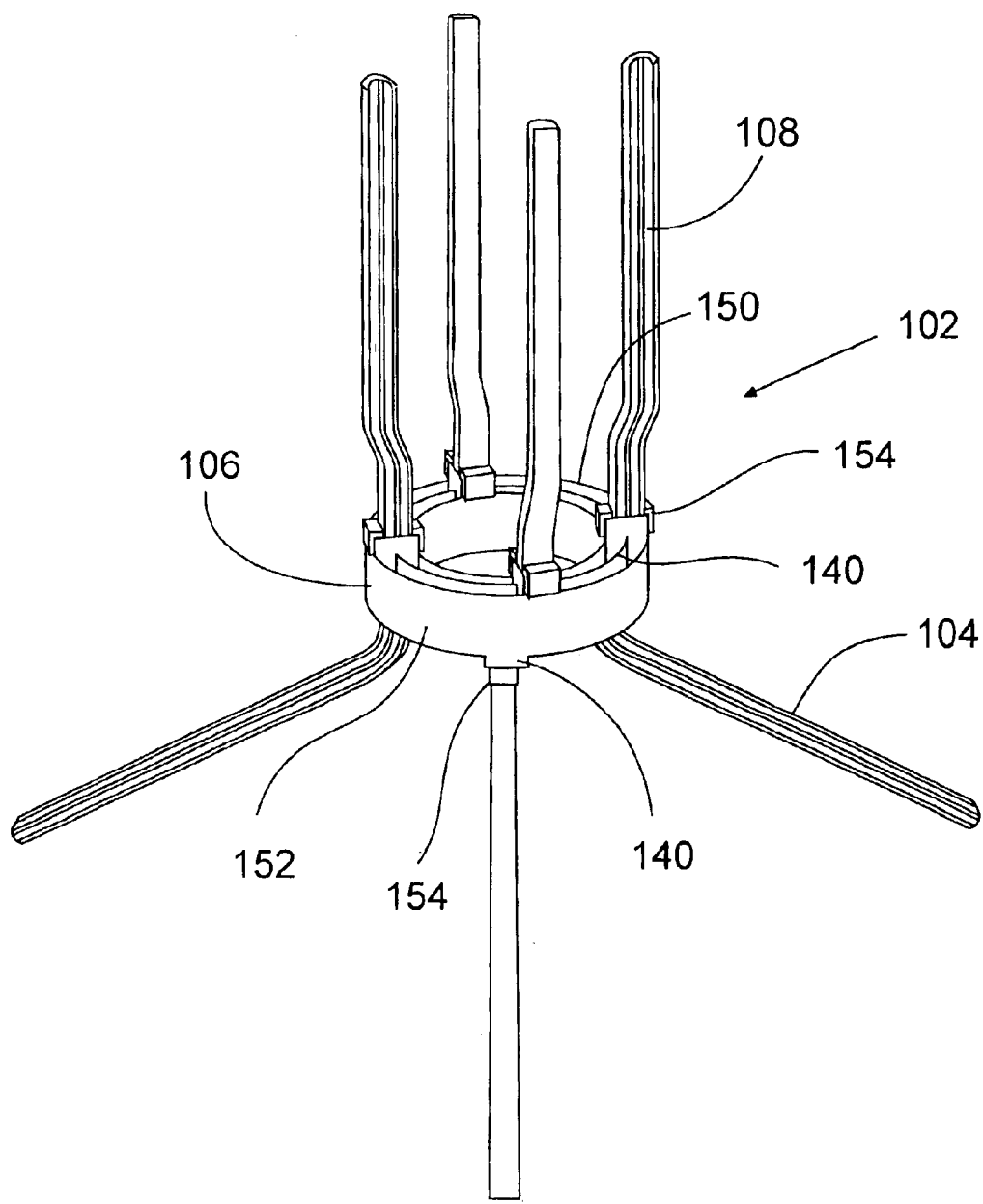
FIG. 5 shows the embodiment of FIG. 4 in perspective view.

Unlike the embodiment of FIGS. 1–3, the embodiment of FIGS. 4–6 has its legs 104 and arms 108 removably attached to the base 106. As seen in FIG. 4 this is accomplished through the use of a series of connector ports 140 formed in desired locations around the top surface 150 and bottom surface 152 of the base 106. The locations as shown are set equidistant from each other on the top surface of the base 106 as well as equidistant from each other on the bottom surface of the base 106. In this embodiment there are three leg connector ports and four arm ports 140 equal in umber to the selected number of legs and arms for this embodiment. As discussed above in relation to FIG. 1, other arrangements and configurations may also be used if desired.

Each leg 104 and arm 108 has a connector plug 154 arranged at the end of the leg or arm that mates with the base 106. The legs as shown are I-beam style with gussets, although they may be hollow or solid tubes. The plugs 154 snap into the respective port 140 and are securely held in place. Alternatively the use of screws and other attachment means may be used to hold them in place.

Preferably, eEach arm plug 154 will only fit in any arm port 140 in a manner that places the arm in the proper position. Likewise, preferably each leg plug 154 will only fit into any leg port 152 in a like manner. Any arm plug 154 will not fit in any leg port 152 and any leg plug 154 will not fit in any arm port 140 due to "key" feature. This ensures that the right components are assembled in the correct position. An alternative embodiment allows any arm or leg port 140 to receive any arm or leg plug 154 and relies on the skill of the person assembling the stand to assemble it correctly.

What we claim:

1. A stand for disposable filter cartridges comprising a base, the base having a horizontal lower surface and a horizontal upper surface and a thickness therebetween; three or more legs having a tower portion for contact with a surface on which the stand is placed and an upper portion attached to the base of the stand, the lower leg portion being connected to the upper leg portion by an angled portion having an angle relative to vertical of from about 20° about 75° and the upper portion of each leg being secured to the lower surface of the base; three or more arms having a lower section that is substantially vertical, the lower section of each arm being secured to the upper surface of the base, a first angled arm section that is angled outwardly from a vertical center line of the lower section at an angle of from about 5° to about 30°, a second angled arm section following the first angled arm section and having a reciprocal angle equal and opposite to that of the first angled section and a substantially vertical upper arm section extending upwardly from the second angled arm section.

2. The stand of claim 1 wherein the arms and legs are removably attached to the base.

3. The stand of claim 1 wherein the arms and legs are permanently attached to the base.

4. The stand of claim 1 wherein the number of arms is one greater than that of the legs.

5. The stand of claim 1 wherein the number of arms is equal to that of the legs.

6. The stand of claim 1 wherein the legs, base and arms are all made from a material selected from the group consisting of metal, selected from the group consisting of stainless steel, steel, aluminum, brass or copper; a plastic selected from the group consisting of polypropylene, nylon, ABS or polycarbonate or a reinforced synthetic material selected from the group consisting of fiberglass, graphite composites and filled epoxies.

7. The stand of claim 1 wherein the legs, base and arms are all made from a metal selected from the group consisting of stainless steel, steel, aluminum, brass or copper.

8. The stand of claim 1 wherein the legs, base and arms are all made from a reinforced synthetic material selected from the group consisting of fiberglass, graphite composites and filled epoxies.

9. The stand of claim 1 wherein the legs, base and arms are all made from a plastic selected from the group consisting of polypropylene, nylon, ABS and polycarbonate.

10. The stand of claim 1 wherein the upper portion of each leg and the lower section of each arm contains an attachment connector and the lower surface and upper surface of the base contains a number of attachment ports equal in number to the legs and arms used respectively in the stand.

11. The stand of claim 1 wherein the base is in the form of a ring.

12. The stand of claim 1 wherein the base is in the form of a ring having a hollow center portion.

13. A stand for disposable filter cartridges comprising a base, the base having a horizontal lower surface and a horizontal upper surface and a thickness therebetween; three or more straight legs having a lower portion for contact with a surface on which the stand is placed and a base portion for attachment of the leg to the base of the stand, the base portion of the legs being connected to the base lower surface by an angled portion having an angle relative to vertical of from about 5° about 75°, three or more arms having a lower section that is substantially vertical, the lower section of each arm being secured to the upper surface of the base, a first angled arm section that is angled outwardly from a vertical center line of the lower section at an angle of from about 5° to about 30°, a second angled arm section following the first angled arm section and having a reciprocal angle equal and opposite to that of the first angled section and a substantially vertical upper arm section extending upwardly from the second angled arm section.

14. The stand of claim 1 wherein the number of arms is equal to that of the legs and the arms are offset from the legs so as not to be directly in line with each other.

15. The stand of claim 1 wherein the base contains a series of notches spaced around an outer edge of the base and extending through the thickness of the base.

16. The stand of claim 1 wherein the upper portion of each leg and the lower section of each arm contains an attachment connector and the lower surface and upper surface of the base contains a number of attachment ports equal in number to the legs and arms used respectively in the stand and wherein the attachment ports in the upper surface of the base only fit the attachment connectors of the arms and the attachment ports in the lower surface of the base only fit the attachment connectors of the legs.

* * * * *